3,184,445
CLARIFICATION OF GELATIN

Adolf W. Fogiel, Dearborn, and William R. Rose, Fowlerville, Mich., assignors, by mesne assignments, to American Agricultural Chemical Company, a corporation of Delaware
No Drawing. Filed Mar. 7, 1961, Ser. No. 93,840
5 Claims. (Cl. 260—118)

This invention relates to gelatin. More particularly, this invention relates to the clarification of turbid gelatin extracts or solutions.

Various procedures are known for the clarification of gelatin extracts or solutions. For the most part these procedures have not been completely satisfactory. For example, some clarification procedures practiced heretofore lead to deterioration of the physical properties of the gelatin due to excessive and/or prolonged contact of the clarification agents with the gelatin. Other clarification procedures are not readily controlled and/or do not satisfactorily eliminate turbidity from high concentration or high bloom strength gelatin solutions. Still further, other gelatin clarification procedures are not suitable for use in the clarification of turbid, high bloom strength gelatin unless such gelatins are changed to relatively very low bloom strength gelatin by heat treatment and/or by acid hydrolysis.

Accordingly, it is an object of this invention to provide an improved method for the clarification of very turbid gelatin solutions.

Another object of this invention is to provide an improved method for the clarification of turbid gelatin solutions of any bloom strength.

Still another object of this invention is to provide a method for the clarification of very turbid, concentrated gelatin solutions.

Yet another object of this invention is to provide a controllable method for the clarification of gelatin.

Still another object of this invention is to provide a flexible method for the clarification of gelatin wherein the clarification conditions employed are relatively mild with the result that clarified, high bloom strength gelatins are producible from turbid, concentrated, high bloom strength gelatin solutions.

How these and other objects of this invention are achieved will become apparent in the light of the accompanying disclosure.

It has now been discovered that gelatin solutions are readily and expeditiously clarified by admixing therewith freshly prepared aqueous dicalcium phosphate slurry together with a water-soluble aluminum compound under conditions to form in the resulting admixture flocculent tricalcium phosphate and permitting the resulting formed flocculate (flocculent tricalcium phosphate) to settle therein to yield a clarified, aqueous gelatin solution.

Gelatin solutions, aqueous gelatin extracts, readily clarified in accordance with the practice of this invention usually contain a minor amount of gelatin dissolved therein, below about 50% by weight, such as an amount of gelatin in the range 2–20% by weight, more or less, based on the aqueous gelatin solution. High or low bloom strength gelatins are readily clarified by employing the practices of this invention. Bloom strength is a measure of the jellifying power of gelatin and as used herein is defined as the weight in grams required to impress a ½" diameter plunger four millimeters into a 6.66% by weight aqueous gelatin solution.

In the clarification procedure in accordance with this invention any suitable water-soluble aluminum compound capable of yielding aluminum ions upon dissolution in water may be employed, such as the readily water-soluble aluminum salts, e.g. alum (aluminum sulfate). The water soluble aluminum compound comprises only a minor amount of the clarifying agent, such as an amount in the range 35–50% by weight based on the dicalcium phosphate proper. Desirably, the water-soluble aluminum compound is employed in the form of an aqueous solution, the aluminum compound being present therein in an amount in the range 5–35% by weight, more or less.

In the practice of this invention it is particularly desirable that freshly prepared aqueous dicalcium phosphate slurry be employed in the preparation of the clarifying agent, flocculent tricalcium phosphate. It has been found that the age of the aqueous dicalcium phosphate reagent has a marked affect upon the temperature necessary to effect flocculate formation and clarification of the gelatin undergoing treatment. The influence of the aging of the dicalcium phosphate upon the clarification temperature in the practice of this invention is illustrated by the data presented in accompanying Table No. 1.

TABLE NO. 1

| Age of dicalcium phosphate slurry: | Temperature of clarification, °F. |
|---|---|
| 10 minutes | 136–140. |
| 20 minutes | 142–145. |
| 30 minutes | 145–149. |
| 60 minutes | 153–156. |
| 3 hours | No clarification even at boiling point of gelatin solution. |

It has been found that when freshly prepared aqueous dicalcium phosphate is utilized a clarification temperature in the range 100–130° F. can be satisfactorily and advantageously employed. Accordingly, with such a low clarification temperature the bloom strength and other physical properties of the gelatin undergoing clarification are not adversely affected.

Following the clarification operation in accordance with this invention, i.e. the incorporation of freshly prepared dicalcium phosphate and aluminum ions e.g. aluminum sulfate, in the aqueous gelatin solution undergoing treatment with the resultant formation of flocculate, flocculent tricalcium phosphate, the resulting admixture is permitted to settle for a period of time, such as a number of hours, to yield a resulting clarified gelatin solution. After settling, the resulting clarified gelatin solution can be readily separated from the flocculant tricalcium phosphate which contains turbidity-forming material entrapped therein or occluded thereto by decantation. If desired, the settling-separation process can be expedited by subjecting the admixture after the formation of the tricalcium phosphate flocculate to centrifuging. Another method of accelerating the settling-separation process is to incorporate into the admixture, after the flocculent tricalcium phosphate has been formed therein, a substantial amount of water, such as an amount of water equivalent to about ⅓ of the volume of the gelatin-containing admixture. Following agitation a resulting water-diluted gelatin-flocculate admixture is permitted to settle and the resulting supernatant clear gelatin solution decanted. This operation can be repeated again with the addition of more water until substantially all of the gelatin has been eluted from the admixture. By this technique, water dilution, the settling time for decantation and separation of the clarified gelatin from the flocculate can be substantially reduced, from about 12 hours to about 2–6 hours with substantially complete recovery of gelatin.

Following the clarification and the recovery of the resulting clarified gelatin, it is the usual practice, particularly in commercial operations to deash the gelatin which usually contains about 2% by weight ash. Gelatin deashing is readily accomplished, i.e., the removal of water-soluble, inorganic salts therefrom, by ion exchange, such as by passing the clarified gelatin solution through an ion exchange column or by otherwise contacting the aqueous gelatin solution with a small amount of ion exchange resin. Other methods of effecting deashing are known and are suitably employed.

As indicated hereinabove the practice of this invention with respect to the clarification of gelatin is generally applicable to gelatin solutions from substantially any source. The practice of this invention, however, is particularly applicable to the clarification of very turbid gelatin solutions, particularly "filler" gelatin solutions. Filler gelatin is the gelatin obtained by boiling the residue after the last regular gelatin extraction operation. Since about 10 to 20% of the total available gelatin is contained in this residue and is recovered by boiling, a satisfactory method of clarification of filler gelatin is commercially important. Techniques employed heretofore for the clarification of filler gelatin have not been completely satisfactory, either only partial clarification is obtained by employing rather mild conditions of clarification or else a satisfactorily clarified filler gelatin is obtained at the expense of bloom strength and gelatin yield due to the rather severe treatment conditions known heretofore in order to obtain a satisfactorily clarified gelatin.

All previous methods have usually failed to obtain a satisfactorily clarified gelatin unless the residue from which the filler gelatin is derived is boiled for an extended period of time, such as about 7–8 hours, and the clarification temperature employed is high, e.g. above about 150° F. As a result of these rather severe operations a filler gelatin of relatively very low bloom strength, about 20–50 is obtained. However, by applying the practices of this invention to the clarification of filler gelatin it is possible to obtain a substantially water-clear gelatin with a much shorter residue boiling time, about 2–4 hours, and at a relatively very low clarification temperature in the range 100–130° F. By following the practices of this invention for the clarification of filler gelatin there is obtainable a product gelatin having a bloom strength in the range 90–110 and a viscosity in millipoises of about 30, as measured in a 6.66% by weight solution at 60° C. Indeed, the practices of this invention are particularly applicable to the clarification of very turbid gelatins, such as filler gelatin, since the relatively low temperature employed during the clarification operation tends to preserve the bloom strength in the gelatin undergoing treatment. Indeed, in the practices of this invention the conditions of clarification require a relatively low temperature, below 135° F., preferably below 130° F., such as a temperature in the range 100–120° F., more or less. It has been observed that at higher temperatures, above about 135° F., the conversion of dicalcium phosphate to flocculent tricalcium phosphate during the clarification operation proceeds too rapidly and frequently results in the non-uniform occlusion of the suspended solids or turbidity-producing agents in the gelatin solution being treated.

The following examples are illustrative of the practices of this invention:

*Example No. 1*

A turbid aqueous gelatin solution containing 100 pounds of gelatin, the concentration of gelatin therein being about 10% by weight, is adjusted to a suitable pH, about 5.5, by the addition of acid, preferably phosphoric acid or, if required, by the addition of an alkaline acting material, such as an aqueous lime slurry, depending upon the original pH of the gelatin solution. There is then added to the gelatin solution with vigorous stirring 50 pounds of freshly prepared 12.5% by weight dicalcium phosphate slurry, the slurry having been prepared by thoroughly mixing 50 pounds of 8% by weight phosphoric acid and 3.4 pounds of fresh lime. These amounts of phosphoric acid and lime gave a slight excess, usually below about 10% by weight, of lime over the theoretical stoichiometric quantity required for the formation of dicalcium phosphate. Immediately upon the addition of the freshly prepared, less than about 10 minutes old, dicalcium phosphate slurry, there are added 3 pounds of aluminum sulfate in the form of a 20% aqueous solution. Agitation of the resulting admixture is continued and the admixture heated slowly until the formation of a well formed flocculate, flocculent tricalcium phosphate. The sharp transition from a slurry to a flocculate in the admixture occurs at a temperature in the range 100–130° F., depending upon the age of the dicalcium phosphate slurry. Upon settling and decantation of the resultant supernatant, clarified gelatin solution, there is recovered a water clear gelatin solution from the very turbid original gelatin solution.

*Example No. 2*

The practices of this invention particularly applicable to the clarification of filler gelatin are as follows. The residue remaining after the last regular gelatin extract operation, usually after the seventh extract operation, is boiled for an extended period of time, about 2–4 hours. Desirably, before the resulting solution of filler gelatin is clarified samples of the filler gelatin solution are obtained and clarified in order to establish the excess of lime in the dicalcium phosphate slurry which appears to yield best results. This control step is not necessary save for optimum results since clarified filler gelatin is obtained by following the practices of this invention in the manner described hereinabove.

Employing the control technique in order to obtain optimum clarification results, two samples of the filler gelatin extract containing about 40 grams of gelatin each at a concentration of about 10% by weight are obtained and maintained at a temperature below about 120° F. To one sample there is added 20 c.c. of 8% by weight phosphoric acid ($H_3PO_4$), followed by the addition of 12.5 cc. of 10% by weight lime slurry. There is immediately added about 1.35 grams aluminum sulfate ($Al_2(SO_4)_3$) in the form of an aqueous slurry, e.g. 5 cc. of a 27% by weight aqueous solution. All these additions to the control sample are carried out with vigorous agitation and the agitation continued after the last addition for about 2 minutes. The resulting treated control sample is then permitted to settle for a few minutes and the clarity of the aqueous solution observed.

To another sample, also containing 40 grams of the gelatin to be clarified, there are added in accordance with the procedures described in this example the following reagents: 20 cc. 8% by weight phosphoric acid ($H_3PO_4$), 10 cc. 10% by weight lime slurry and 5 cc. 27% by weight aqueous aluminum sulfate solution. The clarity of each of the clarified gelatins obtained in these samples is then observed and that procedure which gave the better clarity is followed. This control procedure for the clarification of filler gelatin although not necessary in order to obtain a clarified gelatin is desirable since it has been found that in the presence of relatively large quantities of mucous substances which are usually destroyed in the prior art clarification treatments by prolonged boiling, about 7–8 hours, the excess of lime in the freshly prepared dicalcium phosphate slurry should be reduced. This prevents subsequent binding of aluminum ions to the mucous substances which leads to only a partial clarification.

As will be apparent to those skilled in the art in the light of the foregoing disclosure, many modifications, alterations and substitutions are possible in the practice of this invention without departing from the spirit or scope thereof.

We claim:

1. A method of clarifying gelatin which comprises forming an aqueous gelatin solution having a pH of about 5.5, admixing with said solution at a temperature in the range 100–130° F. freshly prepared aqueous dicalcium phosphate slurry less than about 10 minutes old and aqueous aluminum sulfate solution to form tricalcium phosphate in the resulting admixture and permitting the resulting formed tricalcium phosphate to settle to yield a clarified aqueous gelatin solution.

2. A method of clarifying gelatin which comprises forming an aqueous gelatin solution having a pH of about 5.5 and a gelatin content of about 10% by weight, admixing with said gelatin solution freshly prepared aqueous dicalcium phosphate slurry less than about 10 minutes old, said slurry being prepared by admixing phosphoric acid and lime in amounts to yield said slurry containing about 12.5% by weight dicalcium phosphate therein, said slurry being admixed with said gelatin solution so that the temperature of the resulting admixture is below about 130° F. and said resulting admixture contains about 2 parts by weight gelatin to about 1 part by weight said slurry, incorporating in the resulting admixture a water solution of aluminum sulfate, adjusting the temperature of the resulting mixture of solutions to a temperature in the range 100–130° F. to form a flocculate therein and separating the flocculate from the resulting clarified aqueous gelatin solution.

3. A method in accordance with claim 2 wherein the amount of aluminum sulfate incorporated in said resulting admixture is in the proportion 3 parts by weight of aluminum sulfate per 50 parts by weight dicalcium phosphate slurry.

4. A method of clarifying gelatin which comprises forming an aqueous gelatin solution containing about 100 parts by weight gelatin at a temperature below about 130° F. having a pH of about 5.5 and a gelatin content of about 10% by weight, admixing with said gelatin solution a freshly prepared 12.5% by weight dicalcium phosphate slurry less than about 10 minutes old, said dicalcium phosphate slurry being prepared by reacting 50 parts by weight 8% by weight phosphoric acid with about 3.4 parts by weight lime, said slurry being admixed with said gelatin solution in the proportion 50 parts by weight slurry to 100 parts by weight gelatin contained in said gelatin solution, incorporating in the resulting admixture an amount of aqueous 20% by weight aluminum sulfate solution containing 3 parts by weight aluminum sulfate dissolved therein, agitating the resulting mixture and adjusting the temperature thereof to a temperature in the range 100–130° F. to form a flocculate therein and separating the resulting flocculate from resulting clarified aqueous gelatin solution.

5. A method of clarifying gelatin which comprises forming an aqueous gelatin solution having a pH of about 5.5, admixing in said solution at a temperature in the range 100–130° F. freshly prepared aqueous dicalcium phosphate slurry less than about 10 minutes old and an aqueous solution of a water-soluble aluminum salt capable of yielding aluminum ions, permitting the resulting admixture to form tricalcium phosphate and permitting the resulting formed tricalcium phosphate to settle to yield a clarified aqueous gelatin solution.

References Cited by the Examiner
UNITED STATES PATENTS
2,240,116   4/41   Holmes _____ 260—118

WILLIAM H. SHORT, *Primary Examiner.*

L. ZITVER, LEON J. BERCOVITZ, *Examiners.*